(12) United States Patent
Heller et al.

(10) Patent No.: US 11,021,855 B2
(45) Date of Patent: *Jun. 1, 2021

(54) HUMIDITY COLLECTION APPARATUS

(71) Applicant: Philip Heller, Houston, TX (US)

(72) Inventors: Philip Heller, Houston, TX (US);
Grant Schaffner, Cincinnati, OH (US);
Joseph Honeck, Cincinnati, OH (US)

(73) Assignee: Philip Heller, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,766

(22) Filed: Feb. 10, 2020

(65) Prior Publication Data

US 2020/0190776 A1    Jun. 18, 2020

Related U.S. Application Data

(63) Continuation of application No. 16/010,404, filed on Jun. 16, 2018, now Pat. No. 10,683,643.

(Continued)

(51) Int. Cl.
*B01D 5/00* (2006.01)
*E03B 3/28* (2006.01)
(Continued)

(52) U.S. Cl.
CPC .............. *E03B 3/28* (2013.01); *B01D 5/0006* (2013.01); *B01D 5/0009* (2013.01);
(Continued)

(58) Field of Classification Search
CPC .. B01D 5/0003; B01D 5/0006; B01D 5/0009; B01D 5/0012; B01D 5/0039; E03B 3/28;
(Continued)

(56) References Cited

U.S. PATENT DOCUMENTS

| 1,466,670 A | * | 9/1923 | Eudo Monti | B01D 1/02 |
| | | | | 203/21 |
| 2,381,651 A | * | 8/1945 | Dickens | F16K 11/16 |
| | | | | 137/868 |

(Continued)

*Primary Examiner* — Jonathan Luke Pilcher
(74) *Attorney, Agent, or Firm* — David McEwing

(57) ABSTRACT

Method for collecting water vapor from air as liquid water. The method includes a refrigerant compressor circulating refrigerant through a controlled dimensioned condenser into a tubing loop. A portion of the tubing loop functions as a condenser. This tube conveys the pressurized refrigerant through an expansion valve. The refrigerant pressure and temperature decreases. Ambient water vapor collects on the exterior surface of the cooled section of tube now functioning as an evaporator. The water drops from the tube surface into a reservoir for use. The tube loop extends through a multiport control valve. The method includes a control valve that cyclically and sequentially directs the refrigerant pumped from the compressor into alternate ends of the tubing loop. The cycles continually repeat. The cycles can be controlled by fluid temperature. The device can include a power supply and microprocessor controlling the generator and valves. The device may utilize a switch that detects water or ice deposits on the tube. The device can comprise a moveable frame supporting all above components.

16 Claims, 5 Drawing Sheets

Related U.S. Application Data

(60) Provisional application No. 62/519,992, filed on Jun. 15, 2017.

(51) Int. Cl.
   *F25B 47/02* (2006.01)
   *B28B 1/02* (2006.01)

(52) U.S. Cl.
   CPC .......... *B01D 5/0075* (2013.01); *F25B 47/025* (2013.01); *B28B 1/02* (2013.01)

(58) Field of Classification Search
   CPC ........ F25B 13/00; F25B 47/025; F28B 11/00; F28B 9/08; F28B 1/02; F28B 1/06
   See application file for complete search history.

(56) References Cited

U.S. PATENT DOCUMENTS

| | | | | |
|---|---|---|---|---|
| 2,446,910 A * | 8/1948 | Dickens | ................ | F25B 41/046 62/160 |
| 2,888,808 A * | 6/1959 | Jacobs | ................... | F25B 47/022 62/155 |
| 2,976,698 A * | 3/1961 | Muffly | .................. | F25B 47/025 62/160 |
| 3,068,661 A * | 12/1962 | McGrath | ............... | F25B 47/025 62/156 |
| 3,589,437 A * | 6/1971 | Shoji | ......................... | F24F 1/02 165/240 |
| 4,799,363 A * | 1/1989 | Nakamura | .............. | F25B 13/00 62/160 |
| 6,755,037 B2 * | 6/2004 | Engel | .................... | F24F 3/1405 62/177 |
| 9,758,948 B2 * | 9/2017 | Heller | ....................... | E03B 3/28 |
| 10,683,643 B2 * | 6/2020 | Heller | ....................... | E03B 3/28 |
| 2004/0040322 A1 * | 3/2004 | Engel | .................... | F24F 3/1405 62/177 |
| 2012/0055185 A1 * | 3/2012 | Luo | ........................... | F25B 6/02 62/222 |
| 2014/0096548 A1 * | 4/2014 | Heller | ...................... | E03B 3/28 62/93 |

\* cited by examiner

HUMIDITY COLLECTION APPARATUS

CROSS-REFERENCE TO RELATED APPLICATION

This Application is a CONTINUATION APPLICATION of application Ser. No. 16/010,404 filed Jun. 16, 2018 and entitled "Humidity Collection Apparatus" and claims priority to such application which is incorporated herein in its entirety. This Application also claims priority to provisional application Ser. No. 62/519,992 filed Jun. 15, 2017 and entitled Clearwater Humidity Collector. Said Ser. No. 16/010,404 application is also a Continuation in Part of application Ser. No. 14/067,641; now U.S. Pat. No. 9,758,948 issued Sep. 12, 2017, entitled Humidity Collector Apparatus and filed Oct. 30, 2013. The Applicant claims priority to and the benefit of the Oct. 30, 2013 filing date. Application Ser. No. 14/067,641 is further a Continuation in Part of application Ser. No. 13/647,790 entitled Clearwater Humidity Collector filed Oct. 9, 2012. The Applicant hereby claims priority to the Oct. 9, 2012 filing date. Each application Ser. Nos. 16/010,404, 14/067,641 and 13/647,790 are hereby incorporate by reference herein in their entirety.

FIELD OF THE INVENTION

This invention relates in general to atmospheric water collection, specifically capturing ambient water vapor in atmospheric air through deposition or condensation.

BACKGROUND OF INVENTION

It has been an ever-increasing concern that population growth will or has depleted the available water supply for many regions. Subsequently, the cost for water in these areas has increased monetarily as well as socially. Numerous developed and underdeveloped regions across the World face constraints in supplying water for human consumption and agriculture. The developed World finds itself supplying a larger and lager population, needing more food in turn more water to support its growth.

Many companies are losing or have lost the ability compete for commodities such as water. As water supply diminishes from ever-increasing demand pressure, the cost of production increase causing net profits to decrease. Furthermore, many impoverished societies usually base their trade and very livelihoods on agriculture through commodity trade. Without ample water, the essential building block for growth is lost, resulting in a downward spiral on social structure.

Current means of water acquisition include processes such as: extraction from ground or surface water sources, e.g. rivers, lakes oceans and aquifers; as well as from state, commercial, and municipal sewage waste water. Current methods for purifying and detoxifying water to a potable state include methods such as: desalination, distillation and other various forms pressurized filtration. Methods such as these produce an expensive end product due to high fixed costs, high variable cost and high maintenance cost. In relation to other atmospheric water collectors, the Applicant's device provides a distinct advantage by minimizing the mechanical operations, labor cost and energy consumption needed to capture water vapor from the ambient surrounding air.

BRIEF SUMMARY OF THE INVENTION

This device provides a cost effective alternative for clean water production in areas with inadequate water supply. The supply can be used both for human consumption and agriculture. The device utilizes the law of deposition (water vapor undergoing a phase change directly to solid ice) or the law of condensation (water vapor undergoing a phase change to liquid water) to harvest water from the surrounding atmosphere. The device captures ambient water vapor by lowering its temperature sufficiently enough to cause the water vapor deposits on a refrigerated surface in either a liquid state or into a solid state. The refrigerated surface can be the exterior surface of the heat exchanger operating as the evaporator of the device as well as the structure it is secured to.

The device is capable of repeated systematic heating/cooling of its heat exchangers by way of manipulating its chiller system, also known as a Vapor-Compression Refrigeration System or (VCRS), by reversing refrigerant flow in a controlled cyclical pattern within the heat exchangers, i.e. the flow rate and the direction of refrigerant through the respective condensers, valves, and evaporators of the device.

The disclosure explains an alternating cycles of the device that uses at least one refrigerant fluid flow path. The flow path includes at least one expansion valve connected to at least two heat exchangers. The heat exchangers can be tubes having a hollow channels through which refrigerant may flow.

In the first cycle, refrigerant is pumped by at least one compressor into the flow-pathway hollow channels (tubing) of a first heat exchanger operating as a condenser. The refrigerant flows within the compressor where it takes on heat from its mechanical operations and from the pressurization caused by the compressor (i.e. piston compression). As refrigerant flows in a superheated state to the first heat exchanger (operating as a condenser), the heat from the refrigerant immediately begins to transfer through the heat exchanger radiating heat into the atmosphere. The refrigerant flows from the first heat exchanger (operating as a condenser during the first cycle) to an expansion valve, which regulates the refrigerant's flow rate into a second heat exchanger (operating as an evaporator in the first cycle) where it immediately begins to decrease in pressure and temperature as it expands. The refrigerant continues to expand and absorb sensible heat transferred through the second heat exchanger. The heat absorption by the refrigerant cools the surface of the second heat exchanger and the surrounding ambient air to a dew point level where water vapor collects (either as frost or condensed liquid water) on the exterior surface of the second heat exchanger.

The second cycle, activated by a directional control valve, is where the refrigerant reverses flow within the respective heat exchangers. Refrigerant now flows in a highly superheated state to the second heat exchanger, which was previously (first cycle) operating as an evaporator (now operating as a condenser in this second cycle). Rejected latent heat expelled from the phase change process is transferred from the refrigerant through the heat exchanger tube walls, releasing the accumulated frost/water captured by the heat exchanger from the previous first cycle into a reservoir positioned below the device (system). The refrigerant flows from the second heat exchanger to an expansion valve and into the first heat exchanger (now operating as an evaporator in this second cycle) where it is allowed to expand and absorb heat from the atmosphere transferred from the first heat exchanger. The heat absorption by the refrigerant cools the exterior tube surface of the first heat exchanger and the surrounding ambient air to a dew point level where water vapor collects (either as frost or condensed liquid water) on the exterior surface of the first heat exchanger.

Note, the direction of refrigerant flow in the first cycle is from the first heat exchanger (acting condenser) to the second heat exchanger (acting evaporator), whereas in the second cycle the directional flow is from the second heat exchanger (acting condenser) to the first heat exchanger (acting evaporator).

BRIEF DESCRIPTION OF THE DRAWING

The accompanying drawings, which are incorporated in and constitute part of the specification, illustrate preferred embodiments of the invention. These drawings, together with the general description of the invention given above and the detailed description of the preferred embodiments given below, serve to explain the principles of the invention.

DETAILED DESCRIPTION OF THE INVENTION

This device offers an alternative method for water production by extracting ambient water vapor from air through the control or manipulation of the condensation and deposition transition phases.

As more fully described herein, a Vapor-Compression Refrigeration System (VCRS), capable of reversing the refrigerant-cycle or flow through its embodied heat exchangers, is utilized to cause water vapor to condense on the exterior tube wall of a chilled heat exchanger. Simultaneously, the VCRS is causing the exterior tube wall surface of a separate portion of the combined heat exchangers to heat and cause earlier deposited ice or frost to now melt. The melted ice, frost or condensed water falls from the tube wall surface into a reservoir. The VCRS comprises: at least one compressor, at least two Dual-Function Heat Exchangers connected by at least one expansion valve, at least one directional control valve, at least one expansion valve and associated components, a Capacity-Dimensioned condenser component, an evaporator-component and a water collection reservoir. The VCRS may include any valves, bypasses, sights, filters, or receivers.

Figure 4:
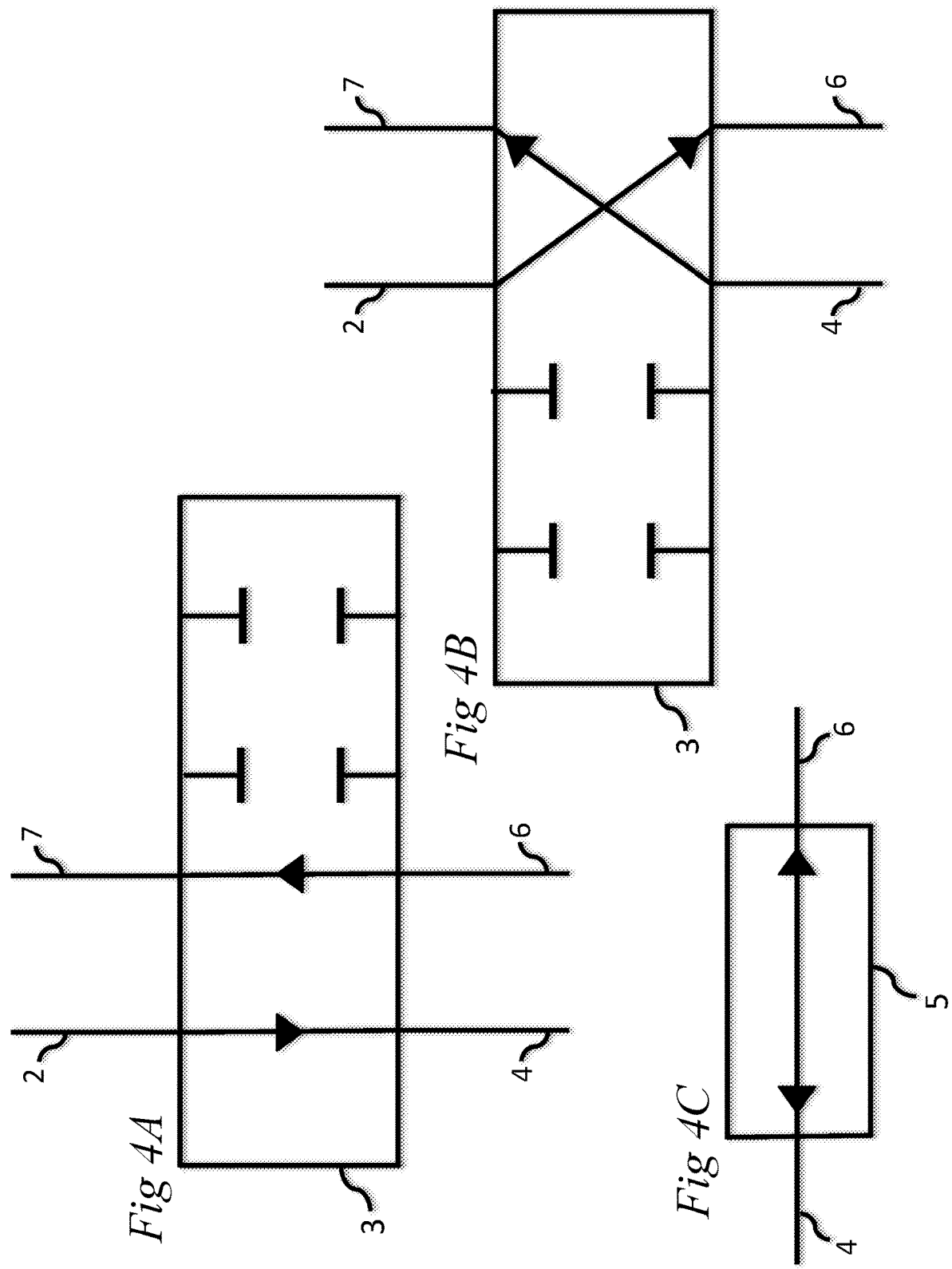
FIG. 4A depicts the side view and mechanical operations of the 4-way/2-position directional control valve, illustrated in FIG. 2, wherein the refrigerant flows from the Capacity-Dimensioned condenser through the first channel of the directional control valve to the first alternate heat exchanger (then through the expansion valve) to the second alternate heat exchanger where it flows through the second channel of the directional control valve to the evaporator-component. This directional control valve position allows the refrigerant to flow in a counterclockwise direction within the Heat Exchange System.
FIG. 4B depicts the side view and mechanical operations of the 4-way/2-position directional control valve, illustrated in FIG. 3, in the opposing alternate position (described in the description of FIG. 4A above), wherein the refrigerant flows from the Capacity-Dimensioned condenser through the third channel of the directional control valve to the second alternate heat exchanger (then through the expansion valve) to the first alternate heat exchanger where it flows through the fourth channel of the directional control valve to the evaporator-component. This directional control valve position allows the refrigerant to flow in a clockwise direction within the Heat Exchange System.
FIG. 4C depicts the side view and mechanical operations of the 2-way/1-position capillary orifice expansion valve wherein the refrigerant can flow through the valve in either direction as shown in FIG. 2 and FIG. 3. The actual direction of flow is determined by the positioning of the directional control valve.
Figure 5:
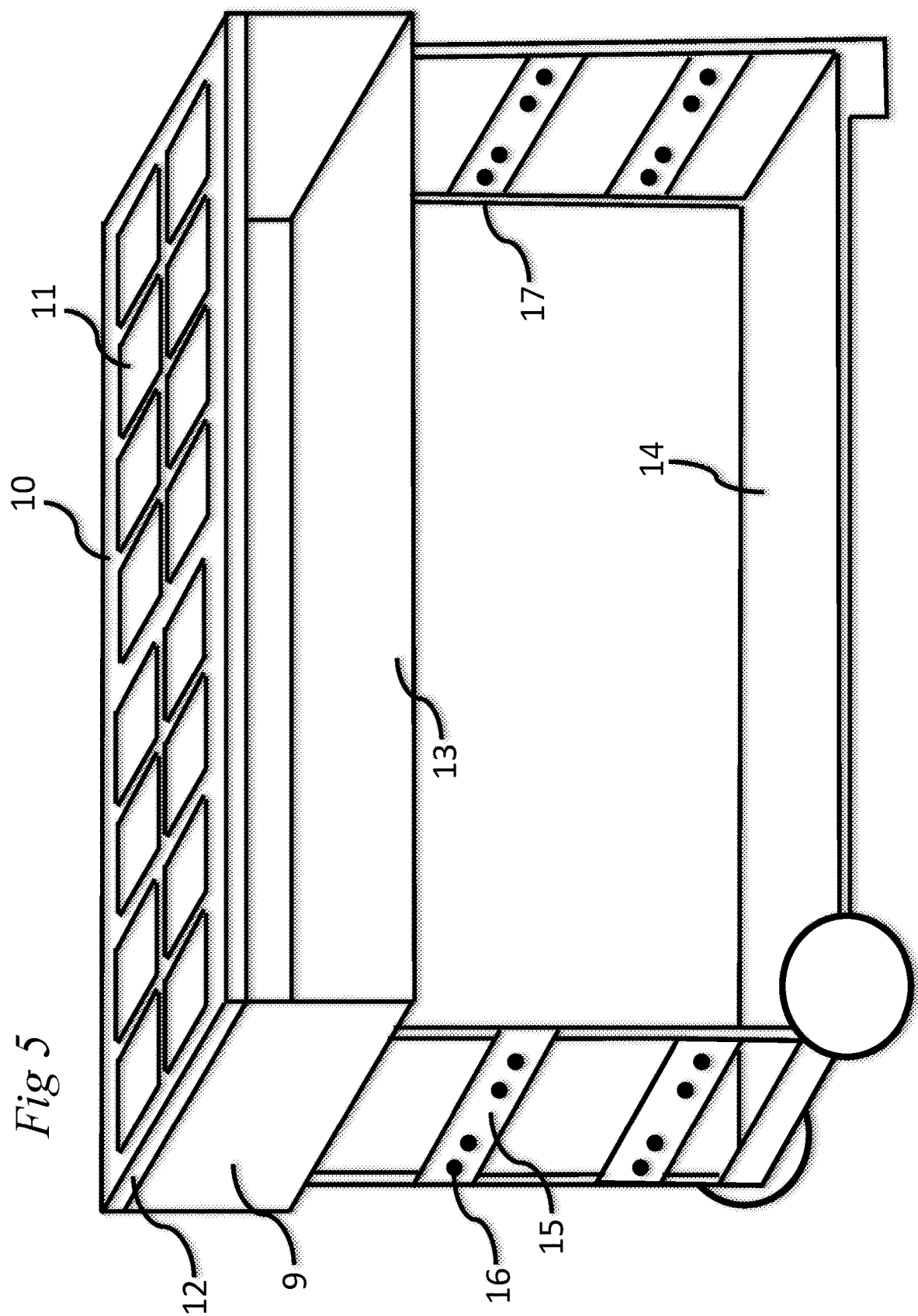
FIG. 5 depicts a frame used to support the VCRS device, including a solar panel sized or dimensioned to provide electrical power to the device including the compressor motor and other optional electrical components such as a CPU or microprocessor. The frame includes structural components to support the heat exchangers, particularly the array of tubes or channels. The device includes wheel components to facilitate the movement of the device and accompanying solar power source.

The Applicant's device is also more time efficient since any solid water (ice) collected on a heat exchanger (see heat exchanger 6 shown in FIG. 2) would more rapidly change in phase to liquid water that can drop from the exterior of the heat exchanger tubing and into the reservoir 8 when the directional cycle reverses and warmed compressed refrigerant now begins to flow from the directional control valve 3 to the heat exchanger 6 as shown in FIG. 4B. (It will be appreciated that FIG. 4A shows the flow path from the CD condenser 2 to the directional control valve 3 and then to the first alternate heat exchanger 4.) The fluid flow is from the CD condenser 2 to a port of the directional control valve 3 and then to heat exchanger 6. In this example, the exterior tubing of heat exchanger 6 may be covered with frozen water as a result of the deposition of water vapor from the prior alternate refrigerant flow cycle.

The system may also include a supporting frame that holds the Dual Function Heat Exchangers. The frame may be flexible or adjustable. This may permit the positioning of each of the Dual-Function Heat Exchangers to be repositioned relative to the other Dual Function Heat Exchanger. The system may also include one or more motorized fans that are cable of directing airflow over one or more the heat exchangers. The fans may be positioned upon the frame. An adjustable frame may be used to change the fan position relative to a heat exchanger. The fans may be powered by a power supply incorporated with the VCRS system discussed below.

The VCRS system may, in one embodiment, comprise a power source for operating the compressor or compressor motor. The power source may also allow for the opening and closing of refrigerant ports of the directional control valve or valves. The directional control valves allow for reversing the direction of the flow of the refrigerant through the hollow channel pathway (also referred to herein as "tubes" or "hollow tubes"). The compressor and power source may also be mounted upon the frame.

The VCRS system may also utilize multiple expansion valves. A pair of valves may be used in parallel depending on the demands of the system. If less volume is required from the expansion valve (which lowers the fluid pressure and temperature of the refrigerant), only one of the two valves may be open and the other parallel valve closed. The orifice or aperture of the valves can also be adjusted to restrict the expansion fluid. This valve adjustment may be performed utilizing the power source, motor and a CPU or a microprocessor. The valve may employ solenoids or motors to close and open the valve ports. The expansion valve also serves to regulate the amount of refrigerant to be released from the condenser into the evaporator.

A thermal expansion valves, in communication with a pressure-sensing bulbs (not shown) can also be utilized to control the alternating reversal flow of refrigerant within the VCRS.

In one embodiment, the heat exchanger tubes may be aluminum. The tubes may be of another metal or metal alloy. The tubes may also be copper, carbon or other material that readily transfers heat through the wall of the tubing. It will be appreciated that carbon composites have high tensile strength to withstand expansive pressure from the compression of refrigerant, as well as the ability to readily transfer heat of the refrigerant through the tube wall to the tube exterior surface.

Using aluminum or lightweight composites may be advantageous since the lightweight will also facilitate delivery and installation of the devices. It will be appreciated that device of the Applicant's disclosure may be used in regions that are not served by a power grid and are not serviced by paved roads.

As mentioned above, the device comprises of one VCRS capable of reversing the refrigerant-cycle (direction of refrigerant flow) through its Heat Exchanger System (HES). The HES comprises at least two hollow channel tube heat exchangers wherein one end of each heat exchanger tube is connected via an expansion valve. For example, FIG. 1 (discussed below) illustrates an HES system comprising a first heat exchanger 4, an expansion valve 5 and a second heat exchanger 6. Also shown is the directional control valve 3.

Figure 1:
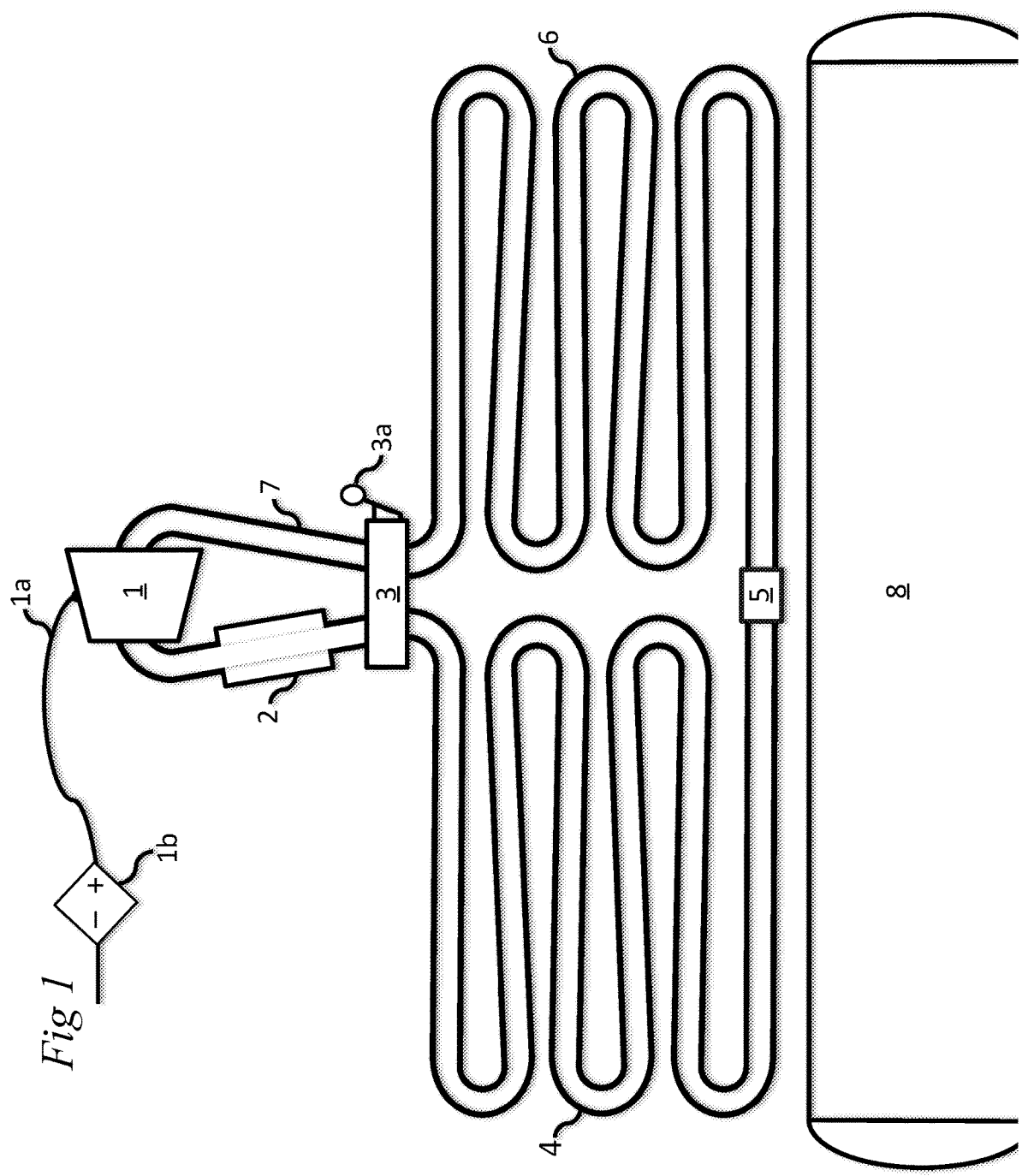
FIG. 1 is a side view of a VCRS device of the disclosure. Illustrated is a power supply connected to a refrigerant fluid compressor. The compressor is connected to an outlet tube that conveys the refrigerant to a Capacity Dimensioned condenser and then to a single 4-way/2-position directional control valve in conjunction with a single fixed capillary expansion valve. The valve combination controls the direction of flow of the alternating refrigerant-cycles of the device. Also illustrated are two refrigerant flow tubes that can convey refrigerant either (i) from the Capacity-Dimension condenser to the directional control valve, or (ii) to the evaporator from the directional control valve. Also illustrated are two heat exchangers and an expansion valve. The heat exchangers are two alternate sections of tubing configured in a serpentine or coiled pattern for conveying refrigerant. Each heat exchanger is connected to the directional control valve. Each heat exchanger can convey to fluid from the directional control valve to the expansion valve. The device of FIG. 1 allows the refrigerant to flow from the direction control valve through a tube section of one heat exchanger to the expansion valve. The expansion valve can regulate the quantity of fluid flowing through the valve to the other heat exchanger. The refrigerant flows through this second heat exchanger to the direction control valve. The control valve, that at this time is already directing fluid flowing from the Capacity-Dimensioned condenser to one heat exchanger, also receives the fluid from the expansion valve, through the other heat exchanger, and then directs the fluid to the evaporator. Tubing conveys refrigerant from the evaporator to the inlet port of the compressor. The tubing section acting as the receiver of fluid from the direction control valve functions as a condenser. The other heat exchanger tubing section receiving fluid from the expansion valve acts an evaporator. The directional control valve can direct the refrigerant to flow to the evaporator and then to the inlet of the compressor. The heat exchangers are connected to the expansion valve. The fluid can flow from the direction control valve into a first heat exchanger, flow through an expansion valve into a second heat exchanger and then back to the direction control valve to an evaporator and then back to the refrigerant fluid compressor via an inlet tube. Also illustrated is the reservoir positioned below the system to retain water condensation that may fall from an evaporator section of a heat exchanger. Also illustrated is a power supply that may be communication with a CPU, the compressor and valves. Also illustrated is a handle for manual control of the Directional Control valve.

The device utilizes at least two Dual-Function Heat Exchangers and at least one directional control valve. Dual-Function Heat Exchangers 4, 6 are illustrated in FIG. 1. A Dual-Function Heat Exchanger ("DF Heat Exchanger") is termed herein as a heat exchanger that is capable of functioning as either a condenser or an evaporator depending on the operations of the VCRS and the directional flow of refrigerant. It will be appreciated that both DF Heat Exchangers utilize the same refrigerant flowing through the heat exchanger tubes.

A directional control valve is termed herein as a valve (or valves) that controls the direction of refrigerant through the HES. The direction of fluid within the HES can be referred to as flowing in a clockwise or counter-clockwise direction. Types of suitable valves include solenoid valves, thermostatic expansion valves, electric regulator valves, pressure regulating valves, three way valves, spool valves, and safety relief valves commercially available from Parker Hannifin Corp. 6035 Parkland Boulevard, Cleveland Ohio, or from White-Rodgers (Emerson) 8100 West Florissant Ave. St. Louis, Mo.

As seen in FIG. 1, more fully described herein as a single VCRS, the system or the channel loop of the system controlled by a 4-way/2-position directional control spool valve 3, with manual actuating lever 3a, powered via an electrical cable 1a, to a controlled voltage source 1b by a compressor 1 that is used to create high and low pressure-sides in the system and to circulate refrigerant through the system—in conjunction with DF Heat Exchangers 4, 6 and expansion valve 5. A water collection reservoir 8 is positioned below the device to collect the release of captured water from the device. A Capacity-Dimension condenser 2 (CD condenser) is designed to be larger than evaporator-component 7 in order to control the relative condenser/evaporator volume ratio difference needed to balance the VCRS. It will be noted that this is needed due to both the DF Heat Exchangers 4, 6 are of the same length and hold the same volume capacity. CD condenser 2 allows (for either DF Heat Exchanger acting as the condenser) additional volume for refrigerant to phase from a highly supper-heated vaporous state and condense into a highly heated liquid state.

Figure 2:
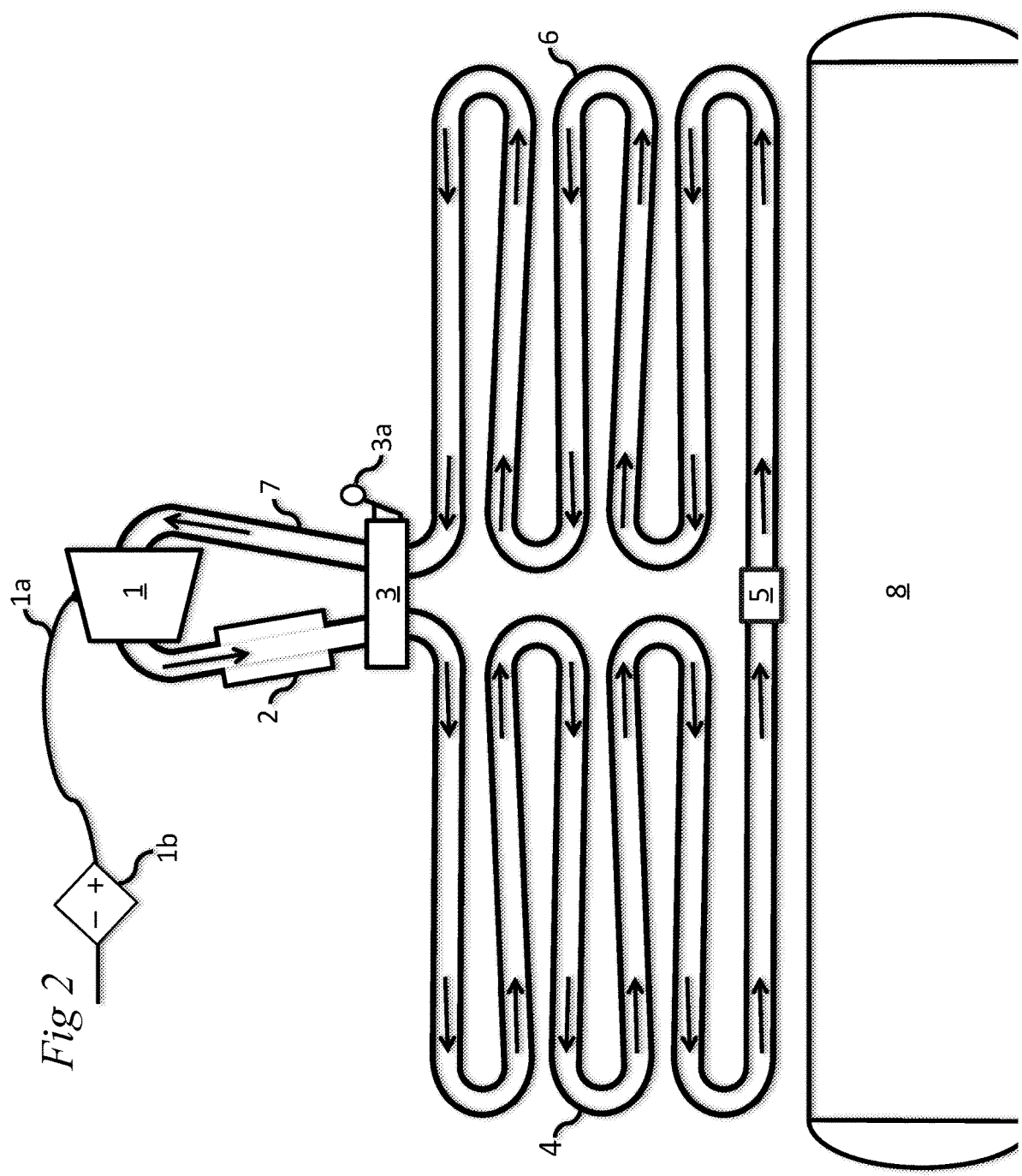
FIG. 2 is a duplicate side view illustration of FIG. 1 with included illustration arrows depicting the refrigerant-cycle flowing in a counterclockwise fashion through the VCRS. It will be appreciated that the flow of refrigerant can also be reversed, by movement of the Directional Control valve, to a clockwise direction through the heat exchangers and expansion valve.
Figure 3:
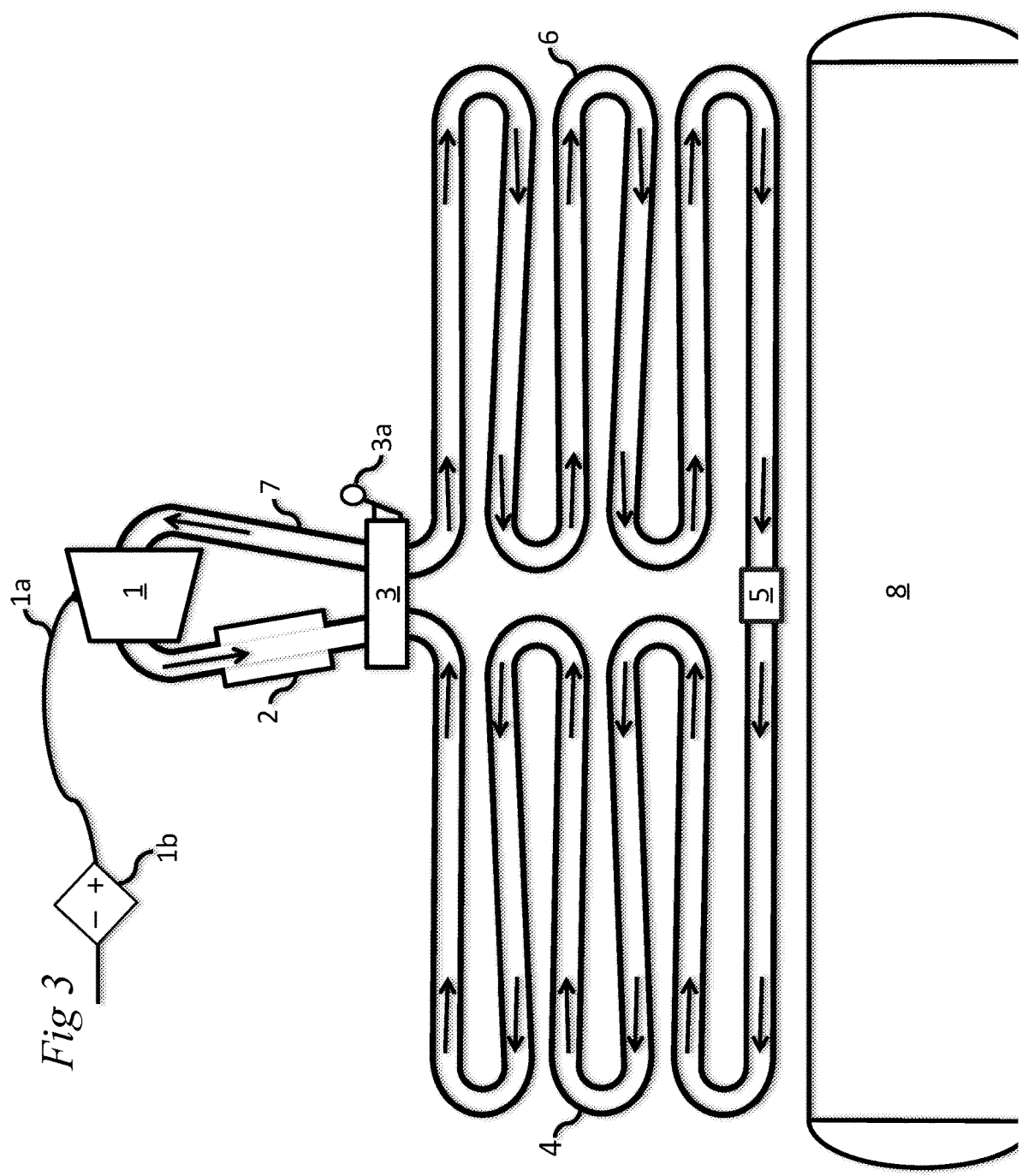
FIG. 3 is a duplicate side view illustration of FIG. 1 with included illustration arrows depicting the refrigerant-cycle flowing in a figure-eight fashion through the VCRS. It will be appreciated that the flow of the refrigerant can reverse within the Heat Exchanger System.

As seen in FIGS. 2 & 3, the system operates two opposing refrigerant-cycles (depicted by directional arrows). In FIG. 2, the refrigerant-cycle flows in a counterclockwise fashion through the VCRS; in FIG. 3, refrigerant-cycle flows in a figure-eight fashion through the VCRS. It will be appreciated that FIG. 3 depicts the refrigerant fluid flows in a clockwise direction through the DF Heat Exchangers and the expansion valve.

There are many substances that have been identified as refrigerants. A partial list is found at https://en.wikipedia.org/wiki/List_of_refrigerants that is incorporated by reference in its entirety herein. See also W.W. Grainger, Inc. grainger.com. Note that varying volume ratios of refrigerant are claimed within the scope of this disclosure.

As seen in FIG. 2, refrigerant, cycling in a counterclockwise fashion through the VCRS, is pumped from compressor 1 as a vapor in a highly supper-heated state to the CD condenser 2, where it begins rejecting latent heat from the phase change process. Note that within the CD condenser 2 the refrigerant under goes a phase change from a gaseous state and condenses into high-pressure liquid.

As seen in FIG. 4A, directional control valve 3, is in a manual un-shifted position, i.e., a "first position". The refrigerant is shown to be flowing from CD condenser 2 to DF Heat Exchanger 4. The refrigerant is also shown to flows from the second DF Heat Exchanger 6 into the evaporator-component 7. As directional control valve 3, is in the un-shifted position (opposed to the manual shifted position as seen in FIG. 4B) the refrigerant flows from CD condenser 2 into the cycle's active condenser, i.e., DF Heat Exchanger 4, where it becomes a sub-cooled liquid, i.e., below the temperature of the phase change from gas to liquid. Still in a highly heated, high-pressure liquid state it continues to radiate heat to the point it enters expansion valve 5.

Note, highly heated state is above the dew point level of the surrounding atmosphere. As seen in FIG. 4C, the expansion valve 5 is a single 2-way/1-position capillary orifice expansion valve. Once the refrigerant exits the expansion valve 5, it enters the active evaporator, i.e., DF Heat Exchanger 6 in a 3/1 liquid-to-vapor ratio where it immediately begins to absorb sensible heat from the atmosphere transferred via DF Heat Exchanger 6. The absorption of heat through DF Heat Exchanger 6 causes the heat exchanger to reach a temperature below or at the dew point level of the atmosphere. At that point, water molecules then begin to accumulate on its exterior surface of DH Heat Exchanger 6 in the form of condensation. Furthermore, once the temperature of DF Heat Exchanger 6, reaches the point of freezing, water molecules begin to undergo a phase change into a solid state (as crystalline ice) on its surface thought the process of deposition. Crystalline ice formation on the heat exchanger enables the heat exchanger's overall surface area to increase, providing additional area for water molecules to accumulate.

The refrigerant flows through DF Heat Exchanger 6 where it continues to expand into vapor by absorbing sensible heat from the atmosphere outside the walls of the tubing. Once, at roughly halfway through DF Heat Exchanger 6, the refrigerant boils and expands into a completely vaporous state. The transformation into the gaseous phase continues to absorb heat from the atmosphere.

The flow of refrigerant continues through the directional control valve 3, to the evaporator component 7, where it is cycled back into the compressor 1 (by the suction effect caused by the compressor 1). As refrigerant flows through the evaporator portion of the system the low-pressure effect within DF Heat Exchanger 6, caused by the compressor 1, causes the refrigerant vapor to expand rapidly and take on heat. At this point the vaporized refrigerant in a super-heated state takes on additional heat by way of the operations of the compressor 1, as it is compressed back into a highly super-heated vapor state to begin the cycle over.

Once sufficient ice has accumulated on DF Heat Exchanger 6, directional control valve 3, is manually is shifted to the opposing position (shown in FIG. 4B). The system may include detection sensors that can provide a signal to the microprocessor or CPU, i.e., controller. Upon receipt of the signal, the controller triggers the directional control valve to reverse the direction of the refrigerant flow. Reversing the refrigerant fluid directional flow is achieved by changing the positioning of the valve mechanism that opens or blocks the valve ports. The position change causes the flow path within the valve to change form that of FIG. 4A to FIG. 4B or vice versa. Note however the refrigerant flow continuously remains in a constant direction within the compressor 1, the CD condenser 2 or the evaporator-component 7.

As seen in FIG. 3, refrigerant cycling in a figure-eight fashion through the VCRS, is pumped from compressor 1, as a vapor in a highly supper-heated state to CD condenser 2, where refrigerate phasing from a gaseous state to a liquid state as it rejects latent heat, takes on sub-cooling and condensed into high-pressure liquid by way of radiating sensible heat into the atmosphere.

As seen in FIG. 4B, directional control valve 3, is in a manually shifted position, i.e., a "second position". The refrigerant is shown to be flowing from CD condenser 2 to DF Heat Exchanger 6. The refrigerant is also shown to flows from the second DF Heat Exchanger 4 into the evaporator-component 7. As directional control valve 3 is in the shifted position, the refrigerant flows from CD condenser 2 into the cycle's active condenser, DF Heat Exchanger 6, in a highly heated, high-pressure state where it rejects latent heat that radiates through the DF Heat Exchanger 6, into the atmosphere and also into the accumulated ice and water condensate that was deposited on the exterior tube surface of the heat exchanger from the previous cycle. The thawing process releases the water and ice condensate from the DF Heat Exchanger 7 and falls into the reservoir tank 8. The refrigerant continues though the heat exchanger channel tubing system where it continues to radiate heat to the point it enters the expansion valve 5. Once the refrigerant exits expansion valve 5, it enters the cycle's active evaporator, DF Heat Exchanger 4, in a 3/1 liquid-to-vapor ratio where it immediately begins to absorb sensible heat from the atmosphere, transferred via the walls of the DF Heat Exchanger 4. The absorption of heat through DF Heat Exchanger 4, causes the exterior surface of the heat exchanger to reach a temperature below or at the dew point level of the atmosphere, where water molecules then begin to accumulate on its surface of the exterior wall in the form of condensation. Furthermore, once DF Heat Exchanger 4, temperature reaches a freezing point, water molecules begin to phase into a solid state (as crystalline ice) on its exterior wall surface of the tube though the process of deposition.

The refrigerant flows through DF Heat Exchanger 4 where it continues expand into vapor absorbing sensible heat. At roughly halfway through the length of the DF Heat Exchanger 4, the vapor/liquid refrigerant mix boils and expands into a completely vaporous state, i.e., complete phase change and transformation of all liquid into vapor, the temperature of the fluid increases from the boiling temperature.

The refrigerant takes on heat by way of compressor 1, causing a low-pressure effect within DF Heat Exchanger 6. Now in a super-heated state, the refrigerant is drawn back into compressor 1, where it is compressed back into a highly super-heated vapor to begin the cycle over.

Once sufficient ice has accumulated on DF Heat Exchanger 4, directional control valve 3, may be manually is shifted to its initial position (as seen in FIG. 8A), to initiate the mechanical operations of the flow-cycle depicted in FIG. 2, facilitating the accumulation of condensate on DF Heat Exchanger 4, while releasing the captured condensate from DF heat exchanger 6, into reservoir tank 8. It will be appreciated that the direction of flow has been reversed through the heat exchangers and expansion valve. As note earlier, the flow of heated refrigeration fluid will more rapidly change the ice to liquid and allow collection in the reservoir.

The system may include detection sensors that can provide a signal to the microprocessor or CPU, i.e., controller. Upon receipt of the signal, the controller signals the directional control valve to reverse the direction of the refrigerant flow. Note however the refrigerant flow remains in a constant direction within the compressor 1, the CD condenser 2 or the evaporator 7. The detection sensors may, in one embodiment, detect or monitor the temperature of the refrigerant fluid at a selected location on each heat exchanger. This sensor may be insulated to prevent the measurement of temperature of fluid within the tube or channel to be impacted by the adjacent ambient air temperature.

The cyclical process of cooling and heating the heat exchangers causes water to accumulate into a solid or liquid state on the exterior surface of the heat exchanger tube walls and then, in a liquid state as condensation, be released into the device's reservoir. It will be appreciated that the reservoir may have a valve positioned to remove the liquid water. The reservoir may also be connected to a pump.

The Heat-Exchanger System (HES), comprises at least two connected heat exchanger sections of the VCRS, and structured to facilitate heat transfer with the ambient air adjacent to the device. For this reason, the surface of the HES is left exposed to the adjacent atmosphere (without insulation) for the purpose of heat-transfer. Each heat exchanger is configured for collecting water directly onto the exterior surface of the tubing wall through the condensation and deposition process.

In one embodiment, the Applicant's device may be utilized within a protective structure to control atmospheric conditions, wherein the device remains subject to temperature and humidity levels of the ambient outside atmosphere. The protective structure, while providing constant ambient temperature and humidity levels, may protect the collection reservoir from outside contaminants. A controlled environment may be a covered enclosure with sufficient air passages to not limit the intake of water vapor (from the outside air) by the device. An uncontrolled atmosphere also provides for constant humidity (relative to the surrounding environment), however it does not protect against particulate contamination of the end product, subsequently water produced may need further filtration given product usage.

As discussed below, the device may include a support structure 10 to contain the entirety of the VCRS as well as an array of additional components and optional CPU or microprocessors. The Applicant's Disclosure includes an embodiment wherein the necessary power for the compressor and compressor motor (not shown) is supplied by a solar power source 11 comprising a plurality of solar panels 20. The solar power source may optionally be mounted on the support structure 10 above the heat exchangers (not shown). It will be appreciated that the horizontal dimensions of the frame structure 12 supporting the solar power source 11 may be expanded in length and width to accommodate additional solar panels. The additional solar panels would facilitate the solar power source 11 supplying sufficient electrical power to meet the power demands of the compressor 1 and compressor motor and other components such as a CPU and valve motor for the 4 way/2 position valve 3 shown in FIG. 1. Recall the device includes heat exchangers 4 & 7, expansion valve 5, directional control valve 3, dimensioned condenser 2, evaporator 9, compressor 1 (including motor) as shown in FIG. 1. In one embodiment, the compressor and motor can be positioned on a shelf 13 positioned below the heat exchanger tubes (not shown). It will be appreciated that placing the compressor and motor, as well as other components that may have significant weight will facilitate stabilization of the device and frame against wind or other events.) The frame structure includes the lower shelf 14, cross braces 15 that may contain apertures 16 through which the horizontal portion of the heat exchanges may be inserted. (Please refer to FIG. 1, reference item numbers 4 & 7 depicting the heat exchangers including the horizontal sections.) The support structure also includes one or more vertical supports 16. The device may include one or more fans (not shown) to push air across the HES in either a controlled or uncontrolled environment; or to control air presser within a controlled environment. Pushing air across the exterior tube wall surfaces of the HES may increase the quantity of water vapor exposed to the tubes. Such fans may also be mounted upon the device frame. Further the support structure may include wheels or other components that facilitate the controlled movement of the device. The support structure may also include handles or other components (not shown) to facilitate manual movement of the device.

In other embodiments, the frame may include wheels or other components that may facilitate repositioning of the device with the surrounding to optimize water recovery. Recall this device may be utilized in remote area not having service by an electrical grid or not having adequate roads to allow installation of the structure. Thus it will be advantageous for the device to have the capability to be self-contained. This capability may be independent production of electrical power by means of wind turbines, water flow turbines, solar panels, human & animal powered turbines or the less beneficial gas powered generators. Also it may useful that the device be preassembled or constructed for module assembly with special tools, etc. It will also be advantageous that the device can be manually transported and repositioned as necessary.

In one embodiment, the device comprises two VCRS, where opposing heat exchangers, condenser/evaporator, are conjoined and alternate operations. (See FIGS. 1 and 2 of Applicant's U.S. Pat. No. 9,758,948 issued Sep. 12, 2017.) U.S. Pat. No. 9,758,948 is incorporated herein by reference within the scope of this disclosure. In another embodiment, the device comprises of two VCRS, where like heat exchangers, condenser/condenser or evaporator/evaporator, are conjoined and are dimensioned proximate to each other in a concentric helically shaped fashion (see Applicant's U.S. Pat. No. 9,758,948).

In another embodiment, the heat exchanger tubes 4, 6, may be configured to create a slope (from the horizontal) to facilitate the collection of liquid water descending down the tube surfaces to be collected at a point to then fall into the water collection reservoir 8.

In one embodiment of the disclosure, multiple pairs of VCRS may be utilized depending on the application needed. Such a VCRS may have multiple Heat Exchanger Systems that may be either permanently welded or a removable gasket assembly. The modular design and multiple sets of VCRS within one unit provide for increased reliability, i.e., one VCRS within the device can be removed for maintenance purposes while the other tube systems are still in operations. The modular structure may comprise a support frame. The support frame may allow a portion of a HES tubing array to separated from the VCRS.

The HES can comprise of non-tube-like heat exchange structures, i.e., adiabatic wheel heat exchangers, plated or shelled heat exchangers, plate fin or pillow plate heat exchangers.

The HES can comprise a single channel (tube-like) structure, i.e. aluminum tubing. In another embodiment, the condenser or evaporator sections can comprise multiple tubes through which refrigerant flows, outer tubing may surround inner tubing. The HES tubing is constructed in a manner that it contains spacing between each pair of tubes. This architecture enhances the circulation of the ambient air and water vapor passing through the tube configuration of the HES tubing.

The HES (or the supporting frame) is also constructed to be rigid to support the accumulation of ice on the surface of the HES. The HES also includes any fans, blowers or air circulation devices that may enhance the flow of air through the tube configuration of the HES. The HES also may contain thermal conducting structure, i.e. micro-fins, micro-plates, or wires attached to one or more tubes. In one embodiment, the HES can comprise a plurality of separate cooling zones. The zones allow the moist air to pass over the progressively cooler zones of the condensation surface. In a further embodiment, the rate of airflow over the cooling zones is controlled. Multiple compressors can also be positioned and connected a plurality of pairs of Dual-Function Heat Exchangers, allowing optimization efficiency. It may also allow optimization of the solar panel size and positioning.

In one embodiment (presented below) flow through the VCRS can be controlled by the by way of thermostatic expansion valves and sensing blubs. In another embodiments, electronic freeze stats, electronic sensing gages and transfer switches combined with electronic programmable device such as a microprocessor control operations under specified conditions, i.e., humidity levels, temperature and barometric pressure of the ambient air or atmosphere. (See FIGS. 1 and 2 of Applicant's U.S. Pat. No. 9,758,948 issued Sep. 12, 2017.) The VCRS may also use measured refrigerant temperature, pressure or liquid flow rate within the interior of the VCRS.

The VCRS may incorporate one or more sensors (i.e. sensing bulbs, electronic freeze stats, etc.) that detect build-up of condensate or frost/ice on the heat exchanger operating as an evaporator. When a predetermined level of frost or ice is detected on the evaporator, a signal can be sent sensors to the controller, i.e., a CPU or microprocessor.

The controller then transmits a signal to the all or some of the valve controllers, e.g., the directional control valves or the expansion valves. The directional control valves will close the opening to a selected portal and open other valve portals such that the direction of refrigerant fluid flow is modified. Simply stated, the ports of the directional control valve will be selectively closed or open to cause the refrigerant to flow in a different direction. This is illustrated in FIGS. 2, & 3, and as well in FIGS. 4A, 4B, & 4C.

This change in refrigerant directional flow comprises the start of an additional VCRS cycle. As modified, refrigerant from the condenser will now flow (reverse flow) to the heat exchanger tube having operated as the evaporator (and which is coated with frost or ice). The refrigerant will now flow through the heat exchanger, through the expansion valve and into the heat exchanger previously serving as the condenser (and now to serve as the evaporator). As previously discussed, the apparatus utilizes each heat exchanger as a condenser and then as an evaporator, combined with a reversal of the direction of refrigerant flow. It will be appreciated that the sensor does not cause the compressor to be turned on or off. Valve position shift (directional control valve) also may not require that the compressor be turned off and on.

One advantage or efficiency achieved by reversing the flow direction of the refrigerant in the VCRS system is that that the flow of the heated refrigerant enters a heat exchanger tube section now coated with ice (solid state). The entry of the heated refrigerant is accompanied by heat radiating from the refrigerant and through to the exterior surface of the heat exchanger tubing. The heating of the heat exchanger tube wall accelerates the displacement of the now melting solid into the water collection reservoir.

The production of the VCRS may be measured in gallons of water that may be collected in the reservoir for each hour of operation. The quantity of the liquid water produced may be a function of the length of the VCRS tube loop, the diameter of the tubes, the thermal coefficient of the tube material, the thickness of the tube walls, the use of "heat radiator fins", capacity and flow rate of the compressor, the quantity of refrigerant allowed to pass through an expansion valve into the evaporator tube section, etc. Production will also be affected by the speed of the compressor or the compressor capacity.

Though effective in most regions, its efficiency is also dependent on humidity levels and temperature of the ambient atmosphere, as well as the airflow and barometric pressure. The most adequate environment for this device may be in areas with high to moderate humidity levels and temperatures. In warm dry climates, it can efficiently collect ambient water vapor at night when relative humidity levels may be at their highest. Airflow may impact the water production by causing evaporation of the liquid water that may have collected on an evaporator tube surface. However, the electrical cost of producing the water may be higher than the cost of water in that region. This can be bypassed by utilizing green energy such as solar cells or wind turbines to power the device. It will also be appreciated that the energy can be utilized for the simultaneous cooling or refrigeration of products or foodstuffs.

The energy efficiency of the device can be improved (thereby lowering the cost to collect liquid water) by utilizing power obtained by a waterpower turbine, a wind driven turbine or by collection of solar energy.

For reference, a typical sized solar panel is 17.6 square feet and produces 265 watts (15 watts per square foot). The sloped, south-facing roof for an average US house receives approximately 4 hours of useable sun per day. Therefor a single panel mounted on a house roof would produce 1 kWh per day. (An average house roof can hold up to 30 solar panels or approximately 8.0 kW of generating power.) https://solarpowerrocks.com/solar-basics/how-much-electricity-does-a-solar-panel-produce/. The compressor of an average refrigerator utilizes approximately 1 to 2 kWh each day. https://www.google.com/search?source+ hp&ei=HAUgW8qHAcbyjwS0v6a4Ag&q=refigerator+ power+consumption& oq=refigerator+power+&gs_l=psy-ab.1.0.0i13k1110.7027.23493.0.26318.43.31.11.0.0.0.161. 3387.0j30.31.0 . . . 0 . . . 1.1.64.psy-ab . . . 1.42.3553.6.0j35i39k1j0i131k1j0i20i264k1j0i67k1j0i131i 20i264k1j0i131i67k1j0i20i263i264k1j0i20i263k1j0i10k1. 106.F04Lclona0Q. Accordingly the Applicant's apparatus may require two multiple solar panels to operate.

The electrical power can utilize one or more solar panels mounted to the VCRS frame. Thus the frame functions for multiple purposes, including but not limited to support and controlled positioning of the tube array, supporting the compressor, evaporator and CD, supporting the valves and valve motors, the power supply, i.e., solar panel and ancillary equipment for generating and regulating electrical current flow as well as one or more batteries for storage of electricity.

In one embodiment, the solar panel can be position at the top of the frame. In another embodiment, the solar panel may be configured to allow the solar panel to axially rotate to maintain a selected angle of orientation of the sun. It will be appreciated that this configuration may require a motor, gears, etc., to power the rotation of panel (a flat surface). The position of the panel above the VCRS system may also provide environmental protection for the VCRS and its components.

An added advantage of the disclosure is that some functions to the VCRS system can be adapted to be performed manually. The valves can be operated and controlled by levers or rotating valve shutoff or gates. The reservoir may have a valve positioned to allow efficient removal of water from the tank for use or consumption. The tank maybe equipped with a pump to facilitate the distribution of collected water.

This specification is to be construed as illustrative only and is for the purpose of teaching those skilled in the art the manner of carrying out the disclosure. It is to be understood that the forms of the disclosure herein shown and described are to be taken as the presently preferred embodiments. As already stated, various changes may be made in the shape, size and arrangement of components or adjustments made in the steps of the method without departing from the scope of this disclosure. For example, equivalent elements may be substituted for those illustrated and described herein and certain features of the disclosure maybe utilized independently of the use of other features, all as would be apparent to one skilled in the art after having the benefit of this description of the disclosure.

While specific embodiments have been illustrated and described, numerous modifications are possible without departing from the spirit of the disclosure, and the scope of protection is only limited by the scope of the accompanying claims.

What we claim are:

1. An ambient water vapor collection method utilizing dual purpose heat exchangers for capturing ambient water vapor from air and producing and collecting liquid water, the method comprising:
   assembling a closed fluid circulating system, the system having
      a fluid compressor having an output port connected to a capacity dimensioned condenser, wherein the capacity dimensioned condenser is structured to have a larger volume than an evaporator component connected to an input port of the fluid compressor, and
      a directional fluid control valve for controlling and reversing in alternating cycles a direction of fluid flow between two dual purpose heat exchangers having surface walls exposed to ambient air, wherein the dual purpose heat exchangers are connected with a dual directional flow expansion valve, wherein the fluid circulating through the dual directional flow expansion valve expands and cools the surface wall of a dual purpose heat exchanger receiving the fluid circulating through the dual directional flow expansion valve sufficient that water vapor within the ambient air condenses on the surface wall for collection as liquid water, and
   arranging the fluid circulating system such that fluid flows in reversing sequence through the directional fluid control valve to one of the dual purpose heat exchangers, the dual directional flow expansion valve, a second one of the dual purpose heat exchangers, back to the directional fluid control valve, and then to the evaporator component, the input port of the fluid compressor, the capacity dimensioned condenser and then back to the now reversing directional fluid control valve.

2. The method of claim 1 further comprising:
   (a) heating and compressing the fluid while pumping the fluid through the compressor and output port to the capacity dimensioned condenser, while the directional fluid control valve is in a first directional position defining a first cycle thus causing the fluid to be pumped into a first of the dual purpose heat exchangers while the fluid is in a heated liquid phase;
   (b) flowing the liquid fluid through the dual direction flow expansion valve;
   (c) causing the fluid to expand to a vapor phase and to cool as the fluid flows through the expansion valve;
   (d) the cooled fluid absorbing heat from the ambient air through the surface walls of a second of the dual purpose heat exchangers;
   (e) cooling the temperature of the ambient air proximate to the surface wall of the second heat exchanger, causing water vapor within the ambient air to condense or freeze on the surface of the second heat exchanger;
   (f) conveying the fluid through the directional fluid control valve to the evaporator component and then to the input port of the compressor;
   (g) controllably changing the position of the directional fluid control valve to a reversing second position defining a second cycle to direct fluid flow from the capacity dimensioned condenser into the second heat exchanger wherein the fluid continues to be compressed and heated by the compressor;
   (h) conveying heated and compressed fluid through the fluid expansion valve to the first heat exchanger;
   (i) cooling and expanding the fluid flowing through the expansion valve;
   (j) the fluid absorbing heat from ambient air proximate to the surface wall of the first heat exchanger;
   (k) causing water vapor within the ambient air to condense or freeze on the surface walls of the first heat exchanger;
   (l) conveying the fluid through the directional fluid control valve in the reversing second position to the evaporator component and then to the input port of the compressor; and
   (m) controllably changing the position of the directional fluid control valve to the first position and first cycle and repeating the steps beginning at step (a).

3. The method of claim 2 further comprising collecting water from condensed or frozen water vapor on the surface walls of the dual purpose heat exchangers into a reservoir.

4. The method of claim 2 further comprising measuring fluid temperature within or upon the surface walls of at least one of the dual heat exchangers.

5. The method of claim 4 further comprising measuring the fluid temperature proximate to junctions between the directional fluid control valve and each of the first and second dual heat exchangers.

6. The method of claim 5 further comprising using the measured fluid temperature to control the cycling and fluid direction reversing of the directional fluid control valve.

7. An ambient water vapor collection method utilizing dual purpose heat exchangers with fluid flowing in cyclically alternating directions for capturing and condensing ambient water vapor from air and producing and collecting liquid water, the method comprising:
  (a) pumping fluid through a closed fluid system comprising a compressor having an out port in communication with a capacity dimensioned condenser, wherein the capacity dimensioned condenser is structured to have a larger volume than an evaporator component connected to an input port of the fluid compressor;
  (b) flowing fluid from the capacity dimensioned condenser to a directional fluid valve capable of cyclically and controllably reversing the direction of fluid flow alternately to a first heat exchanger or a second heat exchanger;
  (c) alternately pumping fluid from the first heat exchanger, acting as a condenser, through an expansion valve to the second heat exchanger, acting as an evaporator, or from the second heat exchanger, acting as a condenser, through the expansion valve to the first heat exchanger, operating as an evaporator, wherein the fluid circulating through the expansion valve expands cools a surface wall of a heat exchanger acting as evaporator sufficient that water vapor within the ambient air condenses on the surface wall for collection as liquid water;
  (d) the directional fluid valve receiving fluid alternately from either the first or second heat exchanger wherein the heat exchanger is operating as an evaporator;
  (e) directing the received fluid through the directional fluid valve with the evaporator component connected to the input port of the fluid compressor;
  (f) controlling the directional fluid valve utilizing a temperature of the fluid received by the directional fluid valve from either the first or second heat exchanger while said first or second heat exchanger is operating as an evaporator.

8. The method of claim 7 utilizing the capacity dimensioned condenser having a volume allowing the fluid exiting the compressor to begin changing phase.

9. The method of claim 7 wherein the larger volume of the capacity dimensioned condenser is maintaining a volume ratio between a combined volume of the capacity dimensioned condenser and one of the first or second heat exchanger and the combined volume of the evaporator component and one of the first or second heat exchanger.

10. A method of water collection comprising
  (a) providing a device for compressing, heating and pumping fluid from a compressor through a capacity dimensioned condenser and into an alternating and reversing directional fluid valve, wherein the capacity dimensioned condenser is structured to have a larger volume than an evaporator component connected to an input port of the fluid compressor, and wherein the alternating and reversing directional fluid valve can direct fluid flow from the capacity dimensioned condenser alternately to and through one of a first tube or a second tube; and
  (b) continuously using the alternating and reversing directional fluid valve to sequentially and cyclically alternate fluid flow to the first tube or to the second tube and cyclically direct fluid out from the second tube or from the first tube to an evaporator component fluidly connected to a compressor fluid input;
  (c) structuring the first and second tubes and a fluid expansion valve with the directional fluid valve to convey alternately compressed or expanded fluid and the fluid experiences repeated phase changes between a fluid gas state and liquid state by alternating direction flow through an expansion valve;
  (d) positioning the device comprising the compressor, the dimensioned capacity condenser, the alternating and reversing directional fluid valve, the first and second tubes, the expansion valve and the evaporator component within a single ambient environment; and
  (e) repeating the phase changes from a liquid state to a fluid gas state to absorb heat, including heat from surface walls of one of the first and second tubes sufficient to cause water vapor in the single ambient environment to condense on the surface walls.

11. The method of claim 10 further comprising causing a phase change of ambient water vapor proximate to and deposited on either the first or second tube receiving fluid after conveyance of the fluid through the expansion valve.

12. The method of claim 11 further comprising collecting phase changed water from ambient air water vapor condensed as liquid or deposited as solid phase onto the first or second tube.

13. A water collection method comprising
  (a) compressing, heating and pumping fluid from at least one compressor through a capacity dimensioned condenser, wherein the capacity dimensioned condenser is structured to have a larger volume than an evaporator component connected to an input port of the compressor, and into a directional fluid reversing valve, wherein the directional fluid reversing valve is directing the fluid flow to and through one of a first tube or a second tube in alternate cycles;
  (b) connecting the first tube and the second tube with a fluid expansion valve and causing a phase change in the fluid from a liquid to a fluid gas phase after it exits the fluid expansion valve, wherein the phase change to fluid gas absorbs heat and lowers a temperature of a surface wall of the first or second tube sufficient to cause water vapor from ambient air to condense on the surface wall;
  (c) the direction fluid reversing valve receiving fluid from the one of a second tube or a first tube and directing the fluid into the evaporator component in communication with an inlet port of the compressor;
  (d) measuring the temperature of the fluid to determine when to change the cyclical direction of the direction fluid reversing valve.

14. The method of claim 13 further comprising the first tube receiving fluid from the directional fluid reversing valve allowing the first tube having a surface wall to act as an condenser and maintaining or condensing the fluid into a liquid phase, the first tube connected to a fluid expansion valve and the fluid expansion valve connected to the second tube having a surface wall, wherein the fluid flows through the first tube through the fluid expansion valve causing the fluid to change phase from a liquid into a fluid gas phase in the second tube thereby allowing the second tube to act as an evaporator, and upon which water vapor from ambient air condenses or freezes upon the surface wall of the second tube, and the fluid is received from the second tube into the directional fluid reversing valve and to the evaporator component and then into the compressor;
  the directional fluid reversing valve changing the directional flow path, wherein the second tube now receives the fluid from the directional fluid reversing valve and the second tube acting as a condenser flowing the fluid in a liquid phase through the expansion valve into the first tube, wherein the first tube acts as an evaporator causing the fluid to change phase from a liquid into a fluid gas phase in the first tube thereby allowing the first tube to act as an evaporator, and upon which water vapor from ambient air condenses or freezes upon the surface wall of the first tube, and the fluid is received from the first tube into the directional fluid reversing valve and to the evaporator component and then into the compressor.

15. An ambient water vapor condensation and capture method comprising:
   (a) utilizing a closed circuit fluid system compressing and pumping fluid from and to a compressor, wherein the fluid is directed from the compressor through a directional control valve that is continuously directing the fluid in cycles through either a first heat exchanger tube or second heat exchanger tube each having a surface exposed to a single ambient air environment;
   (b) connecting each of the first and second heat exchanger tubes to a dual direction fluid expansion valve causing the fluid to expand and cool when exiting the dual direction fluid expansion valve and causing ambient water vapor to condense or freeze on the surface of one heat exchanger tube;
   (c) receiving the fluid from a heat exchanger tube into the directional control valve and the directional control valve directing the fluid into an inlet port of the compressor.

16. The method of claim 15 further comprising controlling the fluid flow direction through the directional control valve by measuring the temperature of the fluid within or upon the surface of at least one of the heat exchanger tubes.

* * * * *